United States Patent [19]

Kimura

[11] Patent Number: 5,452,128
[45] Date of Patent: Sep. 19, 1995

[54] POLARIZATION ILLUMINATION APPARATUS AND PROJECTOR USING THE APPARATUS

[75] Inventor: Kazumi Kimura, Atsugi, Japan

[73] Assignee: Canon Kabushiki Kaisha, Tokyo, Japan

[21] Appl. No.: 6,816

[22] Filed: Jan. 21, 1993

[30] Foreign Application Priority Data

Jan. 21, 1992 [JP] Japan .................. 4-008468

[51] Int. Cl.$^6$ .............................................. G02B 27/28
[52] U.S. Cl. .................... 359/487; 359/49; 353/20; 353/33; 362/19
[58] Field of Search .......... 359/41, 48, 49, 487, 359/493, 495, 483, 485; 353/20, 31, 33, 34, 37; 362/19

[56] References Cited

U.S. PATENT DOCUMENTS

| | | | |
|---|---|---|---|
| 1,734,022 | 10/1929 | Short | 359/493 |
| 2,887,566 | 5/1959 | Marks | 359/487 |
| 3,153,740 | 10/1964 | Murphy | 359/487 |
| 3,233,089 | 2/1966 | Levy | 359/493 |
| 3,508,809 | 4/1970 | Wilder et al. | 359/495 |
| 3,566,099 | 2/1971 | Makas | 359/487 |
| 3,631,288 | 12/1971 | Rogers | 359/493 |
| 5,042,921 | 8/1991 | Sato et al. | 359/49 |
| 5,142,387 | 8/1992 | Shikama et al. | 359/41 |
| 5,295,018 | 3/1994 | Konuma et al. | 359/487 |

FOREIGN PATENT DOCUMENTS

| | | | |
|---|---|---|---|
| 422661 | 4/1991 | European Pat. Off. | 359/495 |
| 63-168626 | 12/1988 | Japan | G02F 1/133 |
| WO92/01969 | 2/1992 | WIPO | 359/48 |

OTHER PUBLICATIONS

Patent Abstracts of Japan, vol. 15, No. 242, Jun. 21, 1991 (JP-A-03 075 620, Mar. 29, 1991).
Patent Abstracts of Japan, vol. 14 No. 191, Apr. 18, 1991 (JP-A-02 037 333, Feb. 7, 1990).
Patent Abstracts of Japan, vol. 15, No. 342, Aug. 29, 1991 (JP-A-03 126 910, May 30, 1991).
Patent Abstracts of Japan, vol. 15, No. 220, Jun. 5. 1991 (JP-A-03 063 690, Mar. 19, 1991).

Primary Examiner—Scott J. Sugarman
Assistant Examiner—John Juba, Jr.
Attorney, Agent, or Firm—Morgan & Finnegan

[57] ABSTRACT

A polarization illumination apparatus is constituted by only a light source, light condensing means having a reflection mirror arranged behind the light source, polarization beam splitting means for splitting light emerging from the light condensing means into first and second polarized light components having different directions of polarization, and return means for returning the first polarized light component to the light condensing means. The direction of polarization of the first polarized light component is changed in such a manner that the first polarized light component from the return means is obliquely incident on and reflected by a mirror surface of the reflection mirror. Therefore, a polarization illumination apparatus which can modulate the vibration direction of polarized light without using an optical phase plate, and has high light utilization efficiency, and a projector using the apparatus can be realized.

16 Claims, 14 Drawing Sheets

VIBRATION DIRECTION

POLARIZATION ILLUMINATION APPARATUS AND PROJECTOR USING THE APPARATUS

BACKGROUND OF THE INVENTION

1. Field of the Invention

The present invention relates to a polarization illumination apparatus and a projector having the polarization illumination apparatus.

2. Related Background Art

FIG. 1 is a view showing an arrangement of main part of a conventional projector using a polarization illumination apparatus. The projector includes a light source 1, a reflection mirror 2, a polarization beam splitter 6, a polarization beam splitting film 20, a liquid crystal light valve 7, and a quarter-wave optical phase plate 13. In FIG. 1, the end portions of two polarization beam splitting films $20_1$ and $20_2$ are in contact with each other to form an angle of about 90° therebetween. Random light Ao emitted from the light source 1 is converted into substantially parallel light (i.e., light substantially parallel to the optical axis) by the reflection mirror 2, and the parallel light is incident on the first polarization beam splitting film $20_1$. In this case, p-polarized light $Ap_1$ is transmitted through the film $20_1$, and s-polarized light As is reflected by the film $20_1$. The S-polarized light As is further reflected by the second polarization beam splitting film $20_2$ arranged along the optical path, and is then converted into circularly polarized light Ar via the quarter-wave optical phase plate 13 whose optical axis is set in a desired direction. The circularly polarized light Ar is transmitted through the quarter-wave optical phase plate 13 again via the light source 1 and the reflection mirror 2, and is converted into light $Ap_2$ including p-polarized light. The light $Ap_2$ is transmitted through the polarization beam splitting film $20_1$, and is then incident on the liquid crystal light valve 7.

In this projector, the two polarized light components, i.e., the p-polarized light Ap and the s-polarized light split by the polarization beam splitting film $20_1$ or $20_2$ are converted to polarized light components having the same direction of polarization so as to illuminate the liquid crystal light valve 7. With this projector, light utilization efficiency can be improved as compared to a projector using no polarization illumination apparatus.

However, since the conventional projector uses the optical phase plate, the light amount is undesirably decreased due to absorption or reflection when light is transmitted through the plate. A conventional plastic optical phase plate has a light transmittance of about 90%. In particular, since a light beam, which returns to the light source 1, and then emerges therefrom, is transmitted through the optical phase plate a total of three times, the light amount is considerably decreased.

SUMMARY OF THE INVENTION

It is an object of the present invention to provide a polarization illumination apparatus, which can modulate a vibration direction, i.e., a direction of polarization of polarized light without using an optical phase plate, and has high light utilization efficiency, and a projector using the polarization illumination apparatus.

According to the present invention, the polarization illumination apparatus comprises a light source, light condensing means including a reflection mirror arranged behind the light source, polarization beam splitting means for splitting light from the light condensing means into first and second polarized light components having different directions of polarization, and return means for returning the first polarized light component to the light condensing means. The first polarized light component returning from the return means is obliquely incident on and reflected by the reflection mirror of the light condensing means, thereby modulating the direction of polarization of the first polarized light component, and outputting the modulated first polarized light component.

DETAILED DESCRIPTION OF THE PREFERRED EMBODIMENTS

Figure 1:
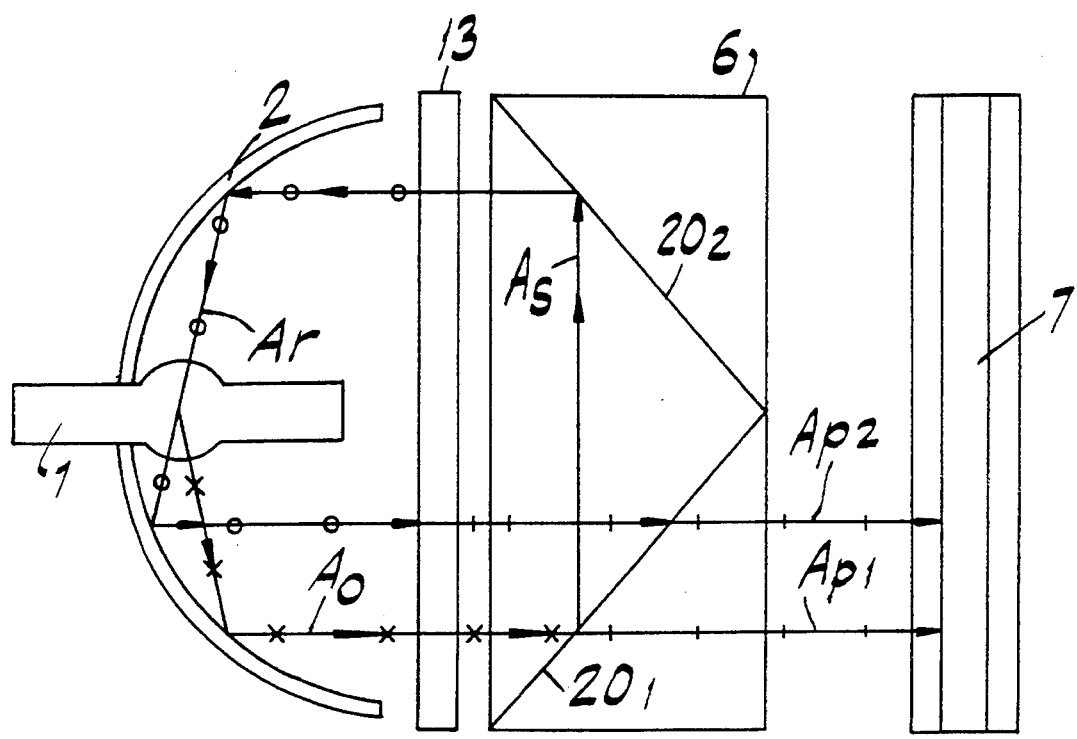
FIG. 1 is a schematic view showing an arrangement of a conventional projector.
Figure 2:
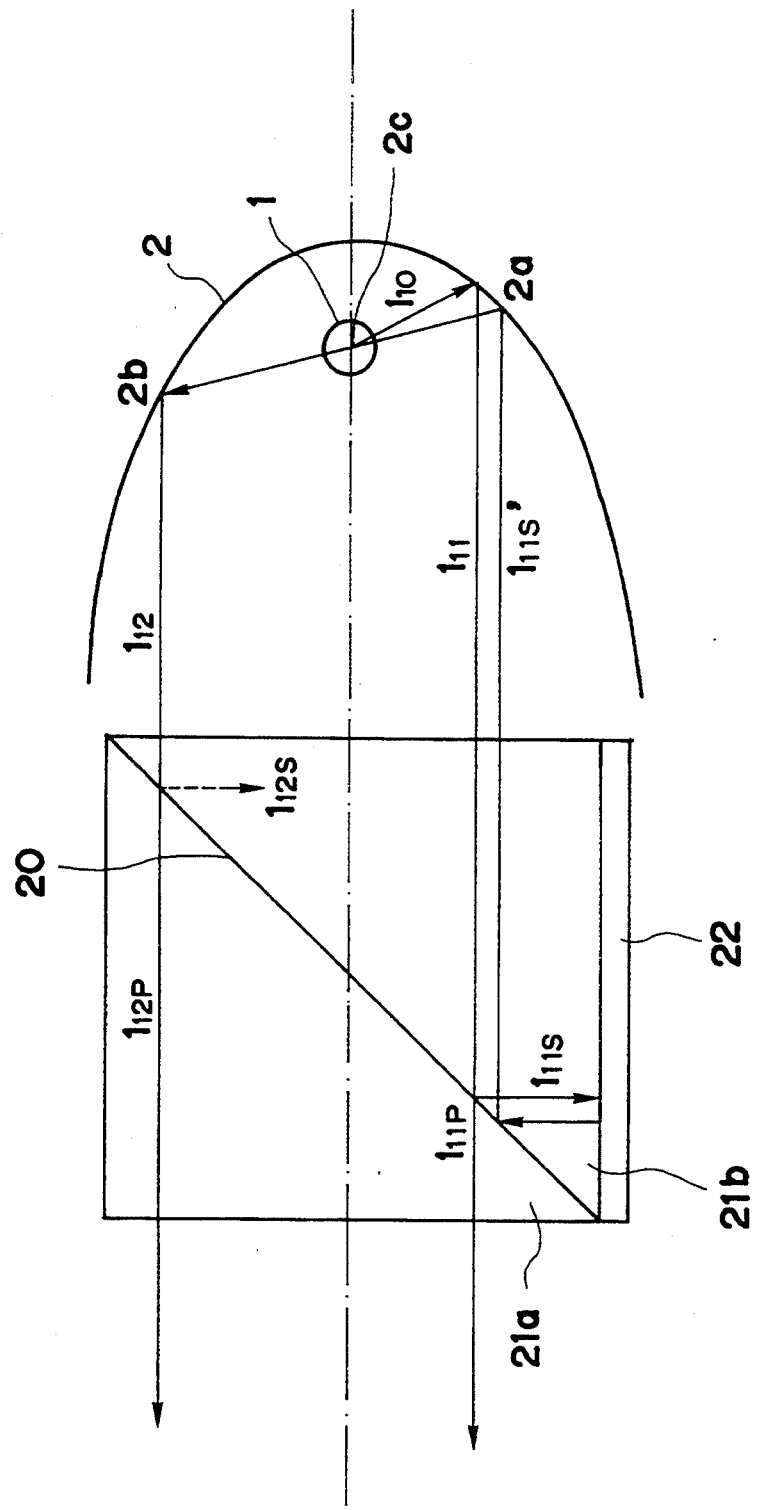
FIG. 2 is a view for explaining an operation of an embodiment of a polarization illumination apparatus according to the present invention.

FIG. 2 shows an embodiment of the present invention.

In FIG. 2, an apparatus of this embodiment includes a metal halide lamp 1 serving as a light source, a reflection mirror 2 serving as a light condensing means, and having a shape of a paraboloid of revolution, a polarization beam splitting (to be abbreviated as PBS hereinafter) film 20, rectangular prisms 21a and 21b, and a plane reflection mirror 22. A polarization beam splitting means is constituted by the PBS film 20, the rectangular prisms 21a and 21b, and the plane reflection mirror 22. The light source 1 is arranged at a focal point position 2c of the parabolic mirror 2, thus obtaining a substantially parallel beam. The substantially parallel beam is split into two linearly polarized light components by a polarization beam splitter. One polarized light component is perpendicularly reflected by the plane reflection mirror 22 arranged on one outgoing face of the polarization beam splitter, and is converted into light (to be referred to as return light hereinafter) returning to the parabolic mirror 2.

A process for obtaining linearly polarized light from substantially parallel light as indefinitely polarized light will be described in detail below.

A ray $1_{10}$ emitted from the center of the light source arranged at the focal point $2c$ of the parabolic mirror 2 is converted into a parallel ray $1_{11}$ (i.e., a ray parallel to the optical axis) by the parabolic mirror 2, and the parallel ray $1_{11}$ is incident on the prism $21b$. At this time, the ray $1_{11}$ is natural light whose direction of polarization is indefinite. The ray $1_{11}$ which has reached the PBS film is subjected to the polarization beam splitting effect, and is split into a pair of linearly polarized light components $1_{11p}$ and $1_{11s}$ having different directions of polarization. The light component $1_{11p}$ is normally called p-polarized light since its direction of polarization, i.e., the vibration direction of polarization is parallel to the plane of drawing. The light component $1_{11p}$ is transmitted through the PBS film 20, propagates through the prism $21a$, and emerges as polarized illumination light from the outgoing face at the side opposite to the incident face of the ray $1_{11}$.

On the other hand, the light component $1_{11s}$ is normally called s-polarized light since its vibration direction of polarization is perpendicular to the plane of drawing. The light component $1_{11s}$ is perpendicularly reflected by the PBS film 20, and propagates through the prism $21b$ toward the plane reflection mirror 22. Since the plane reflection mirror 22 is arranged perpendicularly to the propagation direction of the s-polarized light $1_{11s}$, the s-polarized light $1_{11s}$ changes its propagation direction through 180°, and then propagates toward the PBS film 20 again. Since the light component $1_{11s}$ is s-polarized light, it is reflected by the PBS film 20 again, and returns as return light $1_{11s}'$ along the same optical path (FIG. 2 illustrates distinguishing optical paths before and after reflection for the sake of easy understanding) in the opposite direction. Since the return light $1_{11s}'$ is parallel light, it is reflected at a point $2a$ on the parabolic mirror 2, and returns to the light source 1 located at the focal point $2c$.

The return light $1_{11s}'$ propagates toward the parabolic mirror 2 again as if it were light emitted from the light source 1, and is reflected at a point $2b$ to be converted into a parallel ray $1_{12}$. The parallel ray $1_{12}$ is re-incident on the prism $21b$. The polarization state of the ray $1_{12}$ is considerably disturbed for a reason to be described later, and the ray $1_{12}$ is split into a pair of linearly polarized light components $1_{12p}$ and $1_{12s}$ by the PBS film 20. Since the light component $1_{12p}$ is p-polarized light as in the light component $1_{11p}$, it is transmitted through the PBS film, propagates through the prism $21a$, and emerges from the prism as polarized illumination light. On the other hand, the light component $1_{12s}$ behaves as return light which returns to the light source via the plane reflection mirror 22 as in the light component $1_{11s}$. Upon repetition of the above-mentioned process, all natural light components can be converted into polarized light components in principle.

A change in polarization state of linearly polarized light after it is split by the polarization beam splitting means and returns to the light condensing means will be described below with reference to FIGS. 3 and 4.

Figure 3:
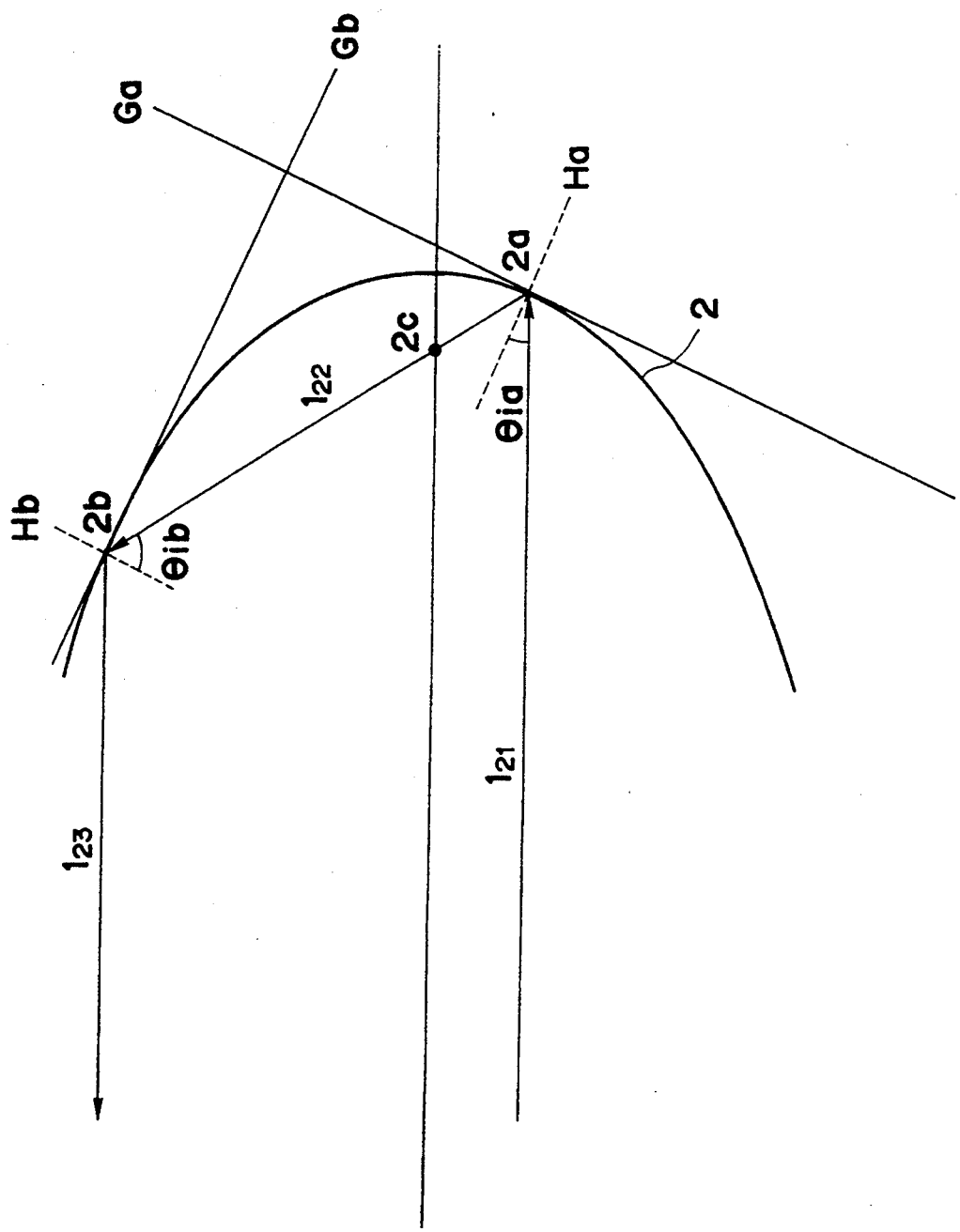
FIG. 3 is a view for explaining the principle of the operation of the polarization illumination apparatus of the present invention.

In FIG. 3, return light $1_{21}$ is reflected at the two points $2a$ and $2b$ on the parabolic mirror 2, and emerges as rays $1_{22}$ and $1_{23}$. In FIG. 3, $2c$ represents the focal point of the parabolic mirror 2, Ga and Gb represent the tangent planes of the points $2a$ and $2b$, and Ha and Hb represent the normals to the points $2a$ and $2b$.

The vibration direction (polarizing direction) of the return light $1_{21}$ is inclined by $\alpha_i$ with respect to the plane of drawing. $\alpha_i$ is called an azimuth, and assumes a positive value when the vibration direction rotates clockwise with respect to the propagation direction of light. FIG. 4 is a view for explaining the azimuth $\alpha_i$ when the opening of the reflection mirror 2 shown in FIG. 2 is viewed from the direction of the PBS film. In FIG. 4, a plane including $m_1$ is parallel to the plane of drawing of FIG. 2, and a plane including $m_2$ is perpendicular to the plane of drawing of FIG. 2. In FIG. 4, a double-headed arrow indicates the vibration direction of the return light $1_{21}$. FIG. 3 is a sectional view taken along $m_3$ rotated from this vibration direction by $\alpha_i$.

Figure 4:
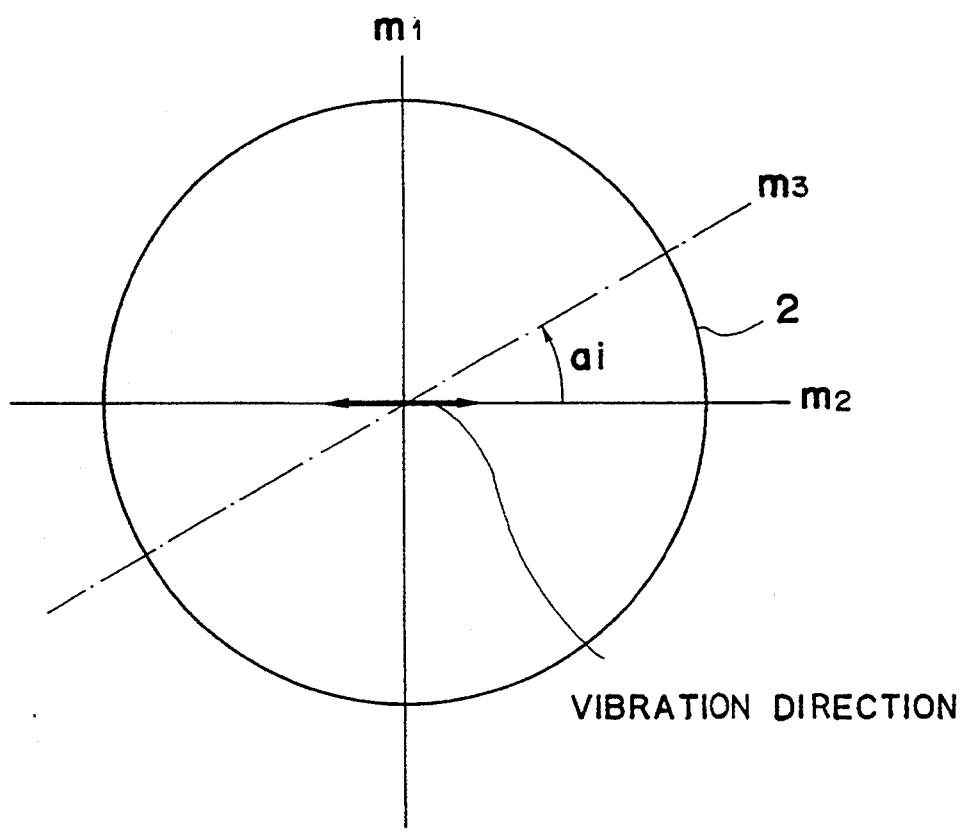
FIG. 4 is a view for explaining the principle of the operation of the polarization illumination apparatus of the present invention.

As described above, the return light $1_{21}$ is linearly polarized light. When linearly polarized light is reflected by a given boundary surface (e.g., reflected at the point $2a$ in FIG. 3), we have:

$$\tan\alpha_r = -\tan\alpha_i\{\cos(\theta_i-x)/\cos(\theta_i+x)\} \quad (1)$$

$$\textit{for } \sin x = \sin\theta_i/n \quad (2)$$

where $\alpha_i$ is the azimuth (an angle defined between the vibration direction and the plane $m_3$, as shown in FIG. 4, will be referred to as an azimuth hereinafter) upon incidence of the light $1_{21}$, $\alpha_r$ is the azimuth upon reflection of the light $1_{21}$, n is the refractive index of the parabolic mirror 2, and $\theta_i$ is the incident angle with respect to the planes Ga and Gb ("Principle of Optics, Tokai Univ. Press").

The refractive index n assumes a real number when the parabolic mirror 2 is a dielectric, and a complex number when it is a conductor. The way of the change in polarization state after reflection depends on the refractive index n.

A case will be described below wherein the parabolic mirror 2 is a dielectric, i.e., the refractive index n assumes a real number. n is the refractive index of a medium of the parabolic mirror 2 when viewed from a medium (air in FIG. 3) where the light $1_{21}$ propagates, and satisfies $n > 1$. For this reason, x is also expressed by a real number from formula (2), and $\alpha_r$ is expressed by a real number, too, from formula (1). Therefore, from formula (1), the vibration direction rotates in a direction to separate from the plane $m_3$ ("Principle of Optics", p. 71). As can be understood from formulas (1) and (2), $\alpha_r$ at that time varies depending on $\theta_i$. Also, as can be seen from FIG. 3, since $\theta_i$ satisfies $0 < \theta_i < \theta_{imax}$ ($\theta_{imax}$ is the angle when the point $2a$ is located at the end portion of the parabolic mirror 2), and assumes every possible value, the azimuth of the light $1_{21}$ also assumes every possible value.

In reflection at the point $2b$, the incident angle assumes every possible value while satisfying:

$$\theta_{ib} = \pi/2 - \theta_{ia} \quad (3)$$

Consequently, the azimuth of the light $1_{23}$ can assume every possible value. Therefore, the vibration directions of outgoing light components including the light $l_{23}$ propagating parallel to the plane of drawing of FIG. 3 are various, and the outgoing light components are in a non-polarized state as a whole. Since the mirror 2 has a shape of a paraboloid of revolution, the azimuth $\alpha_i$ of the light $l_{21}$ naturally assumes every possible value within a range of $-\pi/2 < \alpha_i < \pi/2$. From this viewpoint, the polarization state of the outgoing light from the parabolic mirror 2 is disturbed.

Therefore, the light $l_{23}$ reflected by the parabolic mirror 2 is split into a pair of different linearly polarized light components again by the PBS film 20 shown in FIG. 2.

On the other hand, when the parabolic mirror 2 is a conductor, i.e., when the refractive index n assumes a complex number, the case is different. Since n assumes a complex number, x also assumes a complex number from formula (2). Therefore, since $\alpha_r$ assumes a complex number from formula (1), a phase shift occurs, and the reflected light $l_{22}$ is generally converted to elliptically polarized light ("Principle of Optics", p. 911).

One of necessary conditions that the light $l_{22}$ converted into elliptically polarized light is converted into linearly polarized light again upon reflection at the next reflection point $2b$ is given by:

$$\theta_{ia} = \theta_{ra} = \theta_{ib} \quad (4)$$

where $\theta_{ra}$ is the reflection angle at the point $2a$. This is because when linearly polarized light which is incident on a given interface at an incident angle $\theta_i$ is reflected at a reflection angle $\theta_r (=\theta_i)$, and is converted into elliptically polarized light to have a phase difference $\delta$, elliptically polarized light having a phase difference $-\delta$ which is incident on a similar interface at the incident angle $\theta_r (=\theta_i)$ is reflected onto the interface, and is converted into linearly polarized light according to the principle of retrogradation of light. That is, in order that linearly polarized light and elliptically polarized light having a phase difference $\delta$ therewith retrograde and substitute each other upon reflection, they must satisfy at least formula (4).

Now, since $\theta_{ia} + \theta_{ib} = \pi/2$, formula (4) is not satisfied in general. Even though formula (4) is satisfied, the light $l_{23}$ cannot be converted into linearly polarized light having the same vibration direction as that of the light $l_{21}$ unless a phase difference of $\pi/2$ is generated at each of the reflection points $2a$ and $2b$ of the parabolic mirror 2 shown in FIG. 3. Therefore, since it can be considered that the light $l_{23}$ can never be linearly polarized light, it is obvious that the light $l_{23}$ is split into a pair of linearly polarized light components by the PBS film 20 shown in FIG. 2.

When the azimuth $\alpha_i = 0$ or $\pi/2$, the vibration directions of the light $l_{21}$ and the light $l_{23}$ coincide with each other. In other words, the vibration direction is not rotated even via the parabolic mirror 2, and the light is always incident on the PBS film as s-polarized film. Therefore, the light reciprocally propagates between the plane reflection mirror 22 and the parabolic mirror 2 via the PBS film 20, and does not serve as illumination light.

Upon reflection on a dielectric reflection surface, the rotation (change in $\alpha$) of the vibration direction is small, and the number of p-polarized light components of the light $l_{23}$ with respect to the PBS film 20 may become smaller than the number of s-polarized light component. Similarly, upon reflection on a conductor reflection surface, a small phase difference is generated, and the light $l_{23}$ is converted into elliptically polarized light close to linearly polarized light. As a result, the number of p-polarized light components with respect to the PBS film 20 may become smaller than the number of s-polarized light components. In such cases, in order to positively disturb the vibration direction of the return light $l_{21}$, the light source lamp preferably has a diffusion surface.

Figure 5:
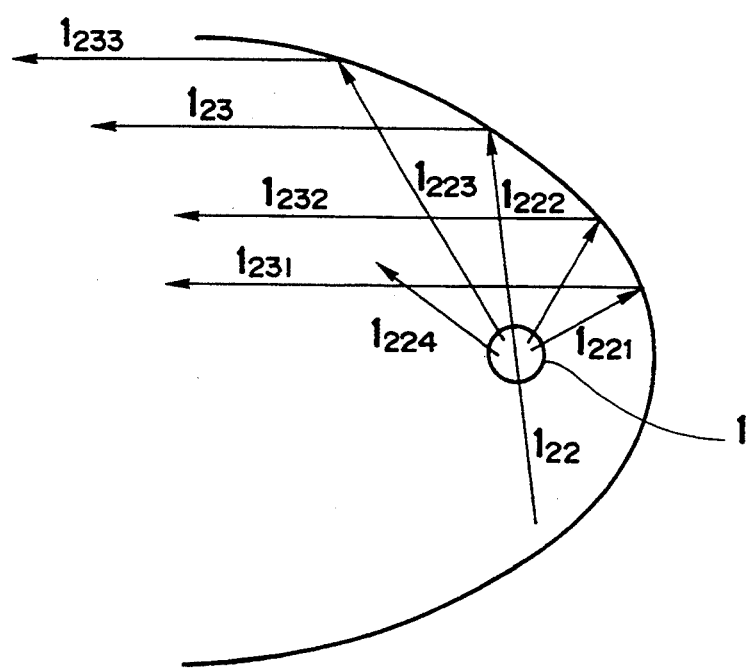
FIG. 5 is a view showing another embodiment of a polarization illumination apparatus according to the present invention.

The diffusion surface is normally considered as a state wherein a large number of very small prisms cover a surface. Since a prism normally has a very small capacity for changing the vibration direction of polarized light, the diffusion surface also has a very small capacity for changing the vibration direction of polarized light. However, the diffusion surface can change the propagation direction of light. For example, as shown in FIG. 5, polarized light $l_{22}$ having a given vibration direction is diffused by the surface of the light source 1, and is split into polarized light components $l_{221}$, $l_{222}$, $l_{223}$, and $l_{224}$. When these light components are incident on various points on the parabolic mirror 2 at various incident angles and are reflected at various azimuths, different polarized light components $l_{231}$, $l_{232}$, and $l_{233}$ can be obtained in addition to polarized light $l_{23}$, thus further disturbing the vibration direction of polarized light.

The reason why the diffusion surface is arranged on or near the lamp surface is that light diffused by the diffusion surface is caused to behave as if it were emitted from the light source 1. If the diffusion surface is arranged at another place, substantially parallel light cannot be obtained by the light condensing means.

The PBS film of this embodiment is normally formed of a dielectric multi-layered film, and is adhered sandwiching between the two rectangular prisms $21a$ and $21b$, thus constituting a so-called polarization beam splitter. The PBS film is designed to split light having an incident angle of 45° into p- and s-polarized light components. A polarization beam splitter corresponding to another incident angle can be manufactured as long as the incident angle is not considerably shifted from 45°.

As the plane reflection mirror 22, a mirror prepared by depositing aluminum on a flat glass plate is normally used. In order to increase the reflectance, a coating for increasing the reflectance may be formed on the mirror. The mirror 22 must be arranged, so that its reflection surface extends perpendicular to the propagation direction of s-polarized light split splitted by the polarization beam splitter.

The parabolic mirror 2 is preferably formed by a cold mirror to prevent a temperature rise of an object to be illuminated since the light source 1 emits a large amount of infrared light. In this embodiment, the reflection mirror having a shape of a paraboloid of revolution, whose sectional shape can be normally expressed by $y = ax^2$, is used. Alternatively, a mirror having a substantially paraboloidal shape whose sectional shape can be expressed by $y = ax^2 + bx^4 + cx^6$ ($a << b, c$) may be used to further improve light condensing characteristics in correspondence with the light emission characteristics of the light source. Also, a light condensing means as a combination of an elliptic reflection mirror and a refraction element may be used. In addition, any other light condensing means such as a light condensing means constituted by a plurality of mirror surfaces to improve the light condensing rate, a light condensing means for adjusting the sectional shape of a beam emerging from the light condensing means using an auxiliary mirror, a light condensing means adopting an aspherical surface, and the like may be adopted as long as substantially parallel light is obtained. In this case, if the reflection loss is small, the number of times of reflection of light by the reflection mirror is preferably as large as possible since the vibration direction of polarized light can be more disturbed.

In the polarization illumination apparatus of the present invention, since return light propagating toward the reflection mirror of the light condensing means is not transmitted through a quarter-wave optical phase plate unlike in the prior art, it remains linearly polarized light. Therefore, the return light can be split into p- and s-polarized light components by the PBS film 20 again owing to the following two effects:

1. rotation of the vibration direction of linearly polarized light upon reflection; and
2. modulation from linearly polarized light into elliptically polarized light due to a phase shift upon reflection when the reflection mirror is formed of a conductor.

Other embodiments of a polarization illumination apparatus according to the present invention will described below.

Figure 6A:
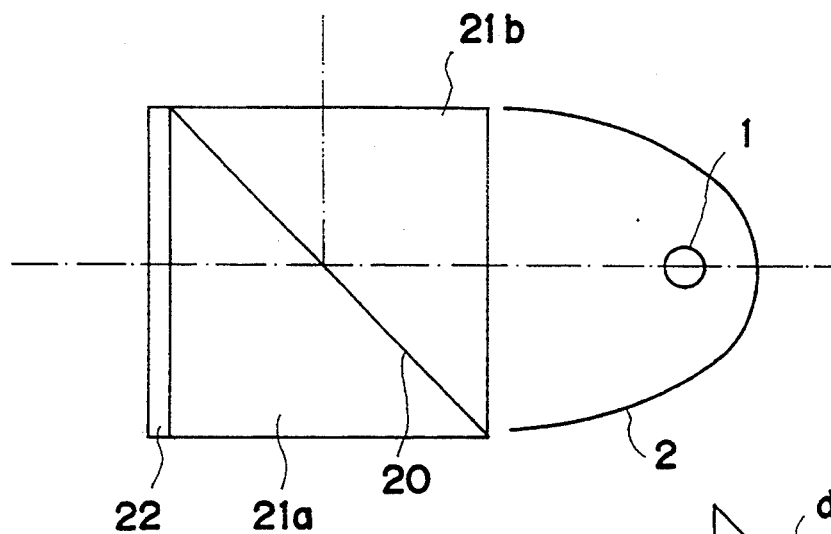
FIGS. 6A to 6C are views showing other embodiments of a polarization illumination apparatus according to the present invention.

In an embodiment shown in FIG. 6A, p-polarized light split by the polarization beam splitter formed by the prisms 21a and 21b and the PBS film 20 is caused to return to the light condensing means, i.e., the parabolic mirror 2 by the reflection mirror 22 unlike in the first embodiment wherein s-polarized light returns to the light condensing means.

Figure 6B:
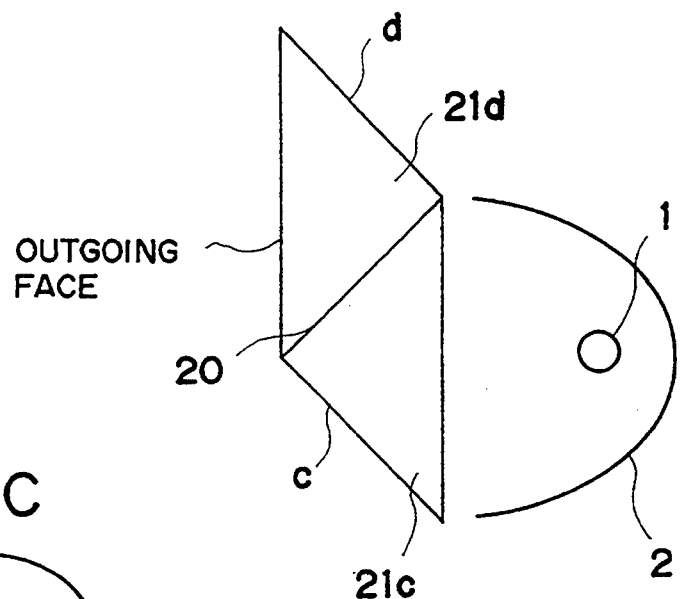
Figure 6C:
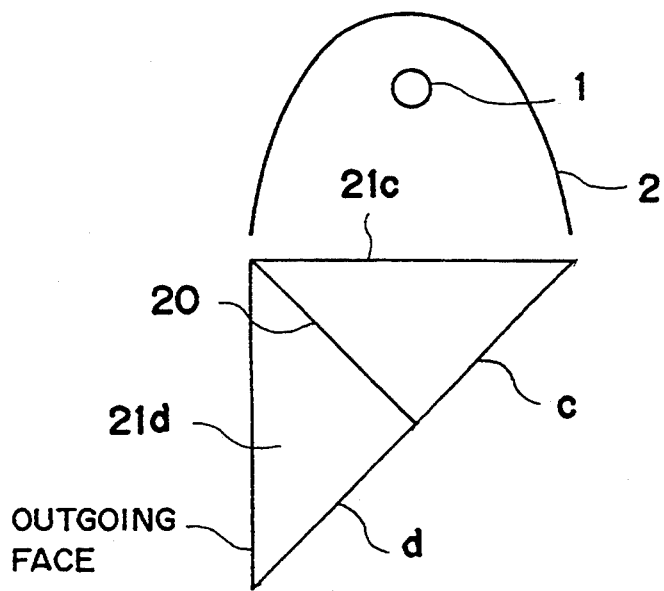

In embodiments shown in FIGS. 6B and 6C, the PBS film 20 is adhered between triangular prisms 21c and 21d each having a right-angled triangular shape. In FIG. 6B, light incident on the prism 21c via the light condensing means (parabolic mirror 2) reaches the PBS film 20 or a total reflection surface c. A light component which has reached the PBS film 20 is split into s- and p-polarized light components by the PBS film 20. The p-polarized light component emerges from the outgoing face of the prism 21d, and the s-polarized light component is reflected by the PBS film and reaches the total reflection surface c. The s-polarized light component is reflected by the total reflection surface c to be converted into return light, which returns to the light condensing means.

On the other hand, of light components incident on the prism 21c, a light component which has reached the total reflection surface c is reflected by the surface c, and propagates toward the PBS film 20. The light component is split into s- and p-polarized light components by the PBS film 20, and the s-polarized light component becomes return light, which returns to the light condensing means. The p-polarized light component is reflected by a total reflection surface d, and emerges from the outgoing face.

In FIG. 6C, light incident on the prism 21c via the light condensing means (parabolic mirror 2) reaches the PBS film 20 or the total reflection surface c. The light which has reached the PBS film 20 is split into s- and p-polarized light components by the PBS film 20. The p-polarized light component is reflected by the total reflection surface d, and then emerges from the outgoing face. The s-polarized light component is reflected by the PBS film, and reaches the total reflection surface c. The s-polarized light component is further reflected by the surface c, and becomes return light, which returns to the light condensing means.

On the other hand, of light components incident on the prism 21c, a light component which has reached the total reflection surface c is reflected by the surface c, and propagates toward the PBS film 20. The light component is split into s- and p-polarized light components by the PBS film. The s-polarized light component is reflected, and becomes return light, which returns to the light condensing means. The p-polarized light component emerges from the outgoing face of the prism 21d.

Figure 7:
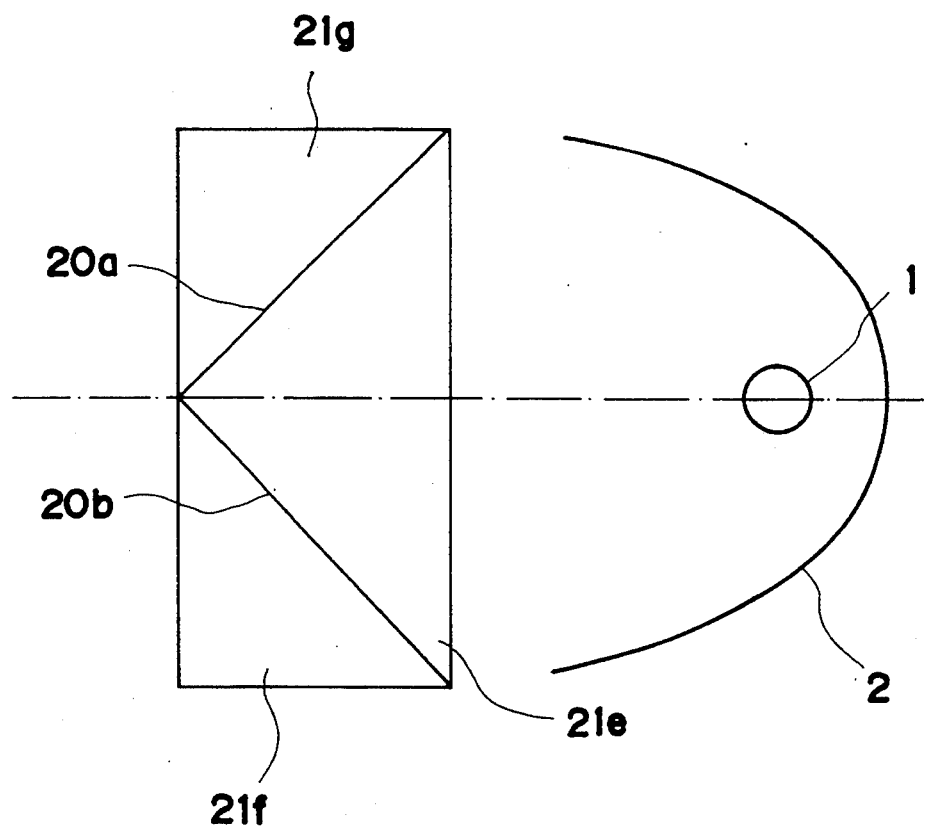
FIG. 7 is a view showing still another embodiment of a polarization illumination apparatus according to the present invention.

In an embodiment shown in FIG. 7, three triangular prisms 21e, 21f, and 21g each having a right-angled triangular section are combined, as shown in FIG. 7, and PBS films 20a and 20b are arranged on the boundary surfaces of these prisms.

Light incident through the parabolic mirror 2 is transmitted through the prism 21e, and is split into p and s-polarized light components by the PBS film 20a or 20b. The p-polarized light component directly emerges from the outgoing face. The s-polarized light component is reflected by the other PBS film, and becomes return light, which returns to the parabolic mirror 2.

In the embodiments shown in FIGS. 6B, 6C, and 7, since a portion formed by the prisms has a volume about half that of the embodiments shown in FIGS. 2 and 6A, a compact, low-cost polarization illumination apparatus can be realized.

Figure 8A:
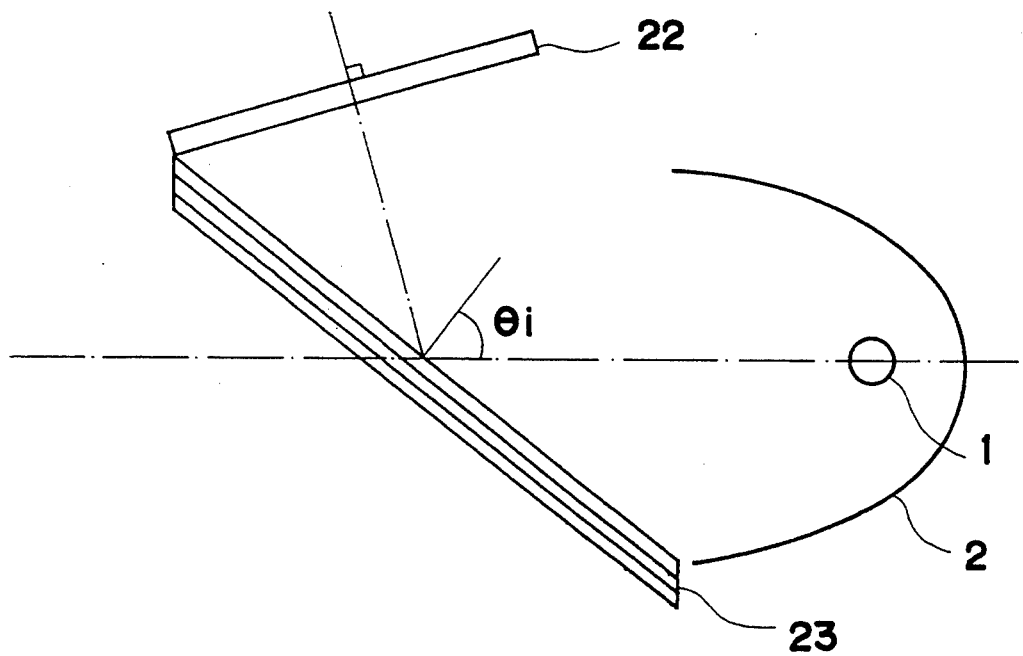
FIGS. 8A and 8B are views showing other embodiments of a polarization illumination apparatus according to the present invention.
Figure 8B:
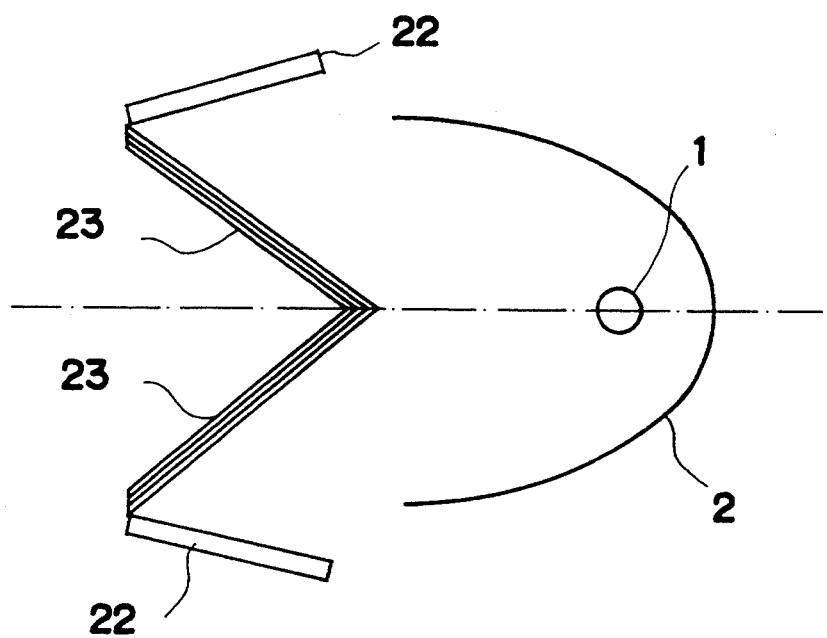

In embodiments shown in FIGS. 8A and 8B, a glass plate layer 23 is used in place of the prisms and the PBS film used in the above-mentioned embodiments. Since a glass plate has polarization beam splitting characteristics as long as a Brewster angle $\theta_i$ is maintained, a polarization beam splitting means can be constituted by stacking a plurality of glass plates without forming a PBS film. As the number of glass plates to be stacked is increased, the polarization beam splitting characteristics can be improved but the transmittance may be decreased. Thus, a PBS film formed of a dielectric multilayered film may be arranged between the glass plates, as needed. The plane reflection mirror 22 is arranged perpendicularly to light reflected by the glass plate layer so that light reflected by the glass plate layer 23 returns along the same optical path.

FIG. 8B shows an application illustration of FIG. 8A. In FIG. 8B, two sets of the glass plate layers 23 and the plane reflection mirrors 22 are arranged to have the optical axis of the light condensing means as an axis of symmetry.

In the embodiments shown in FIGS. 8A and 8B, a lightweight, low-cost apparatus can be realized as compared to the embodiments using the prisms. In the embodiment shown in FIG. 8B, although the number of components is larger than that of the embodiment shown in FIG. 8A, the apparatus can be rendered compact.

In the embodiments shown in FIGS. 6A to 8B, the polarization state of the return light returning to the light condensing means is disturbed since the light is reflected by the parabolic mirror 2 as the light condensing means, and the light emerges from the light condensing means again. In these embodiments, the light source 1 may also have a diffusion surface.

Figure 9:
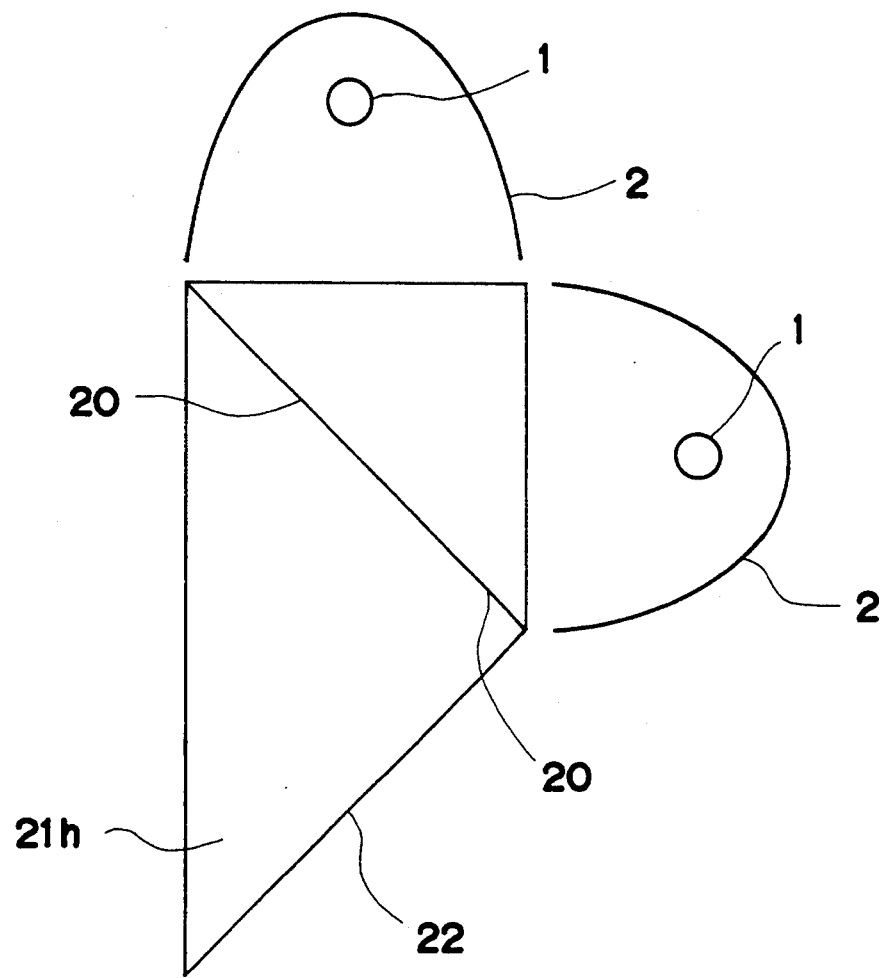
FIG. 9 is a view showing still another embodiment of a polarization illumination apparatus according to the present invention.

FIG. 9 shows still another embodiment, which has two sets of light sources and light condensing means. Of light emerging from one light condensing means, s-polarized light reflected by the PBS film 20 propagates toward the other light condensing means. This embodiment also comprises a prism 21h having a reflection surface 22 for directing p-polarized light components, transmitted through the PBS film 20, of light components from the two light condensing means in the same direction.

Figure 10B:
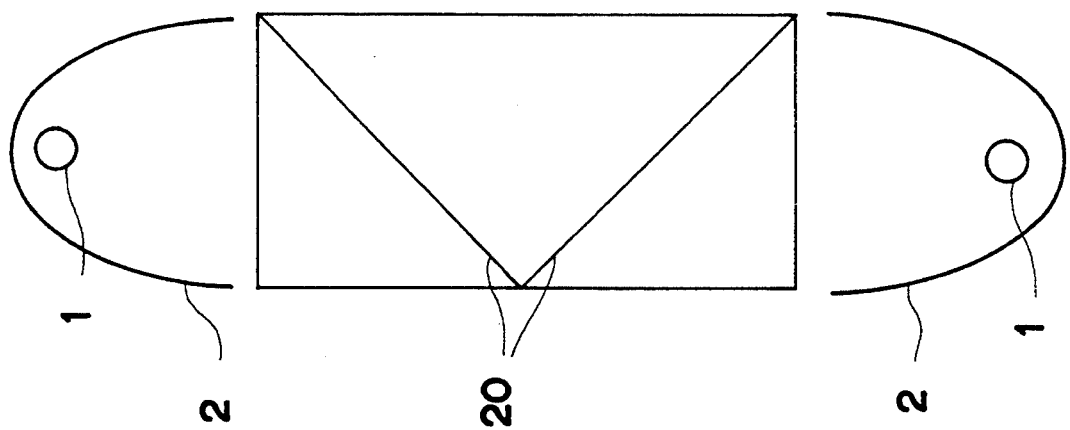
FIGS. 10A and 10B are views showing other embodiments of a polarization illumination apparatus according to the present invention.
Figure 10A:
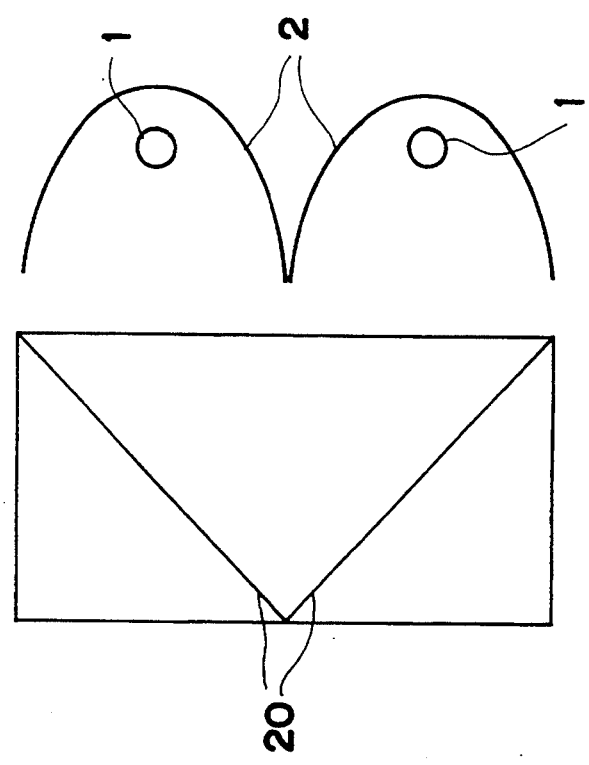

FIGS. 10A and 10B show other embodiments, each of which has two sets of light sources, light condensing means, and PBS films. In FIG. 10A, of light emerging from one light condensing means, s-polarized light reflected by one PBS film propagates toward the other light condensing means via the other PBS film, and of light components emerging from the two light condensing means, p-polarized light components transmitted through the PBS films emerge in the same direction.

In FIG. 10B, of light emerging from one light condensing means, p-polarized light transmitted through one PBS film propagates toward the other light condensing means through the other PBS film, and of light components emerging from the two light condensing means, s-polarized light components reflected by the PBS films emerge in the same direction.

In the embodiments shown in FIGS. 9 to 10B, since the two light sources are used, the light amount can be greatly increased. Normally, in order to increase the light amount, the output of the light source may be simply increased. However, when the output of the light source is increased, the size of the light-emitting portion of the light source is inevitably increased, and parallelness of light via the light condensing means is impaired. When an object to be illuminated having angle dependency such as a liquid crystal light valve is illuminated, it is a necessary condition that illumination light be approximate to parallel light. For this reason, it is very preferable if the light amount can be increased without increasing the size of the light-emitting portion like in the embodiments shown in FIGS. 9 to 10B.

Figure 11:
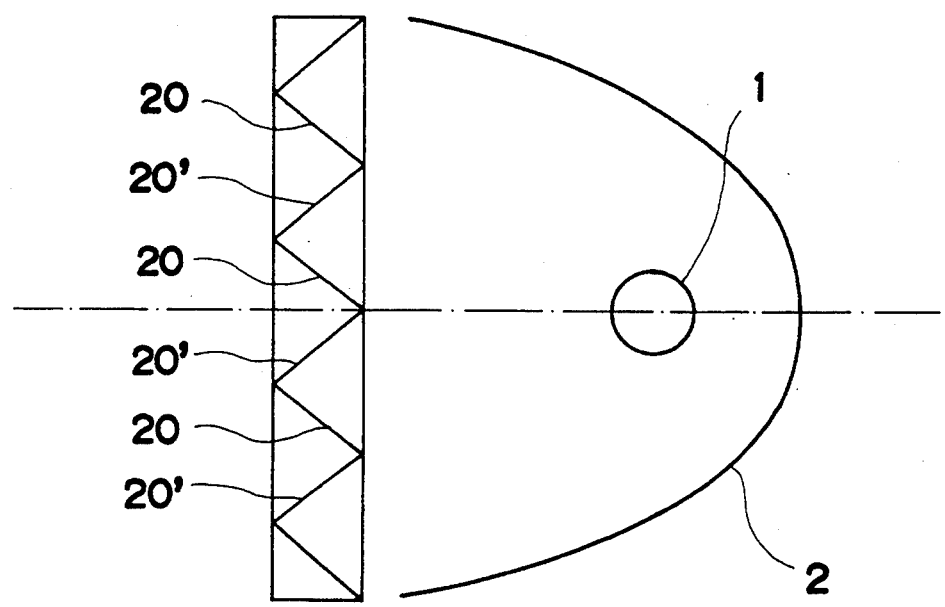
FIG. 11 is a view showing still another embodiment of a polarization illumination apparatus according to the present invention.

FIG. 11 shows still another embodiment. In this embodiment, a section constituted by prisms in the embodiment shown in FIG. 6B or 7 is rendered compact, and a plurality of sections are aligned on the same plane. In FIG. 11, these sections include PBS films 20 and PBS films or reflection films 20'.

An embodiment for minimizing a decrease in parallelness of return light will be described below. When an apparatus is arranged to scatter return light by the surface of a lamp bulb portion, since the return light behaves to have the surface of the lamp bulb portion as a secondary light source, this is equivalent to an increase in diameter of the lamp, and parallelness is decreased. Therefore, in order to minimize a decrease in parallelness, a light source, which does not scatter light by the surface of the lamp bulb portion, can be used. A xenon lamp can form a smooth bulb portion as compared to that of a metal halide lamp. For this reason, the xenon lamp allows easy formation of a lamp, in which light incident on the lamp bulb portion is not easily scattered.

Figure 12:
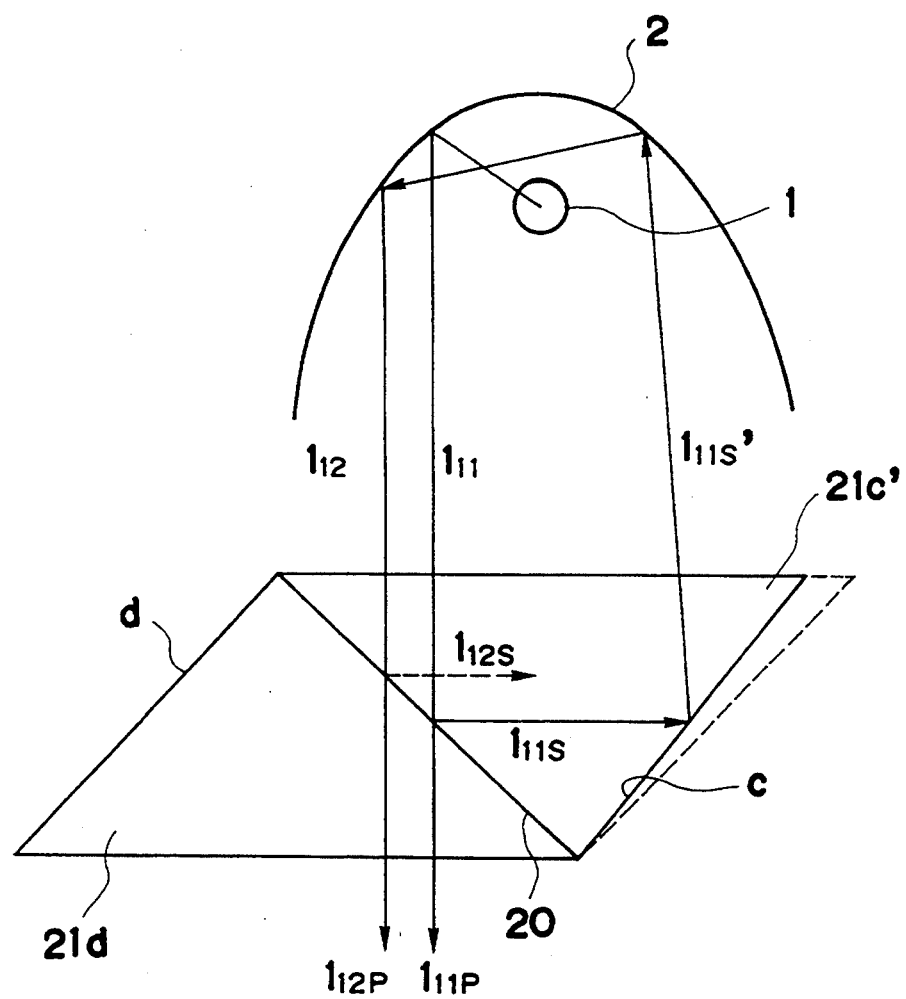
FIG. 12 is a view showing still another embodiment of a polarization illumination apparatus according to the present invention.

FIG. 12 shows an embodiment for preventing return light from being absorbed when it passes through the lamp bulb portion and the light-emitting portion, and from becoming loss light.

This embodiment is substantially the same as the embodiment shown in FIG. 6B, except that the prism 21c is replaced with a prism 21c'.

In this embodiment, a rectangular prism 21d having a triangular prism shape whose section has a right-angled triangular shape, and an acute-angle (close to a right angle) prism 21c' (a section including a broken line in FIG. 12 has a right-angled triangular shape) having a surface which has the same shape and the same area as those of surfaces sandwiching the right angle of the rectangular prism 21d are adhered to each other, as shown in FIG. 12. The PBS film 20 is provided between the adhered surfaces. Note that the PBS film 20 as a multi-layered film may be provided to one of the rectangular prism 21d and the acute-angle prism 21c, and thereafter, these prisms may be adhered to each other, or the PBS film 20 may be provided to both the prisms, and thereafter, the prisms may be adhered to each other. In addition, aluminum may be deposited on total reflection surfaces c and d, as needed.

In FIG. 12, of parallel light $1_{11}$ converted through the parabolic mirror 2, p-polarized light $1_{11p}$ is transmitted through the PBS film 20, and emerges from the rectangular prism 21d. On the other hand, s-polarized light $1_{11s}$ reflected by the PBS film 20 is reflected by the total reflection surface c, and becomes return light $1_{11s}'$. Since the PBS film 20 and the total reflection surface c do not form a right angle the return light $1_{11s}'$ is not parallel to the parallel light $1_{11}$, and propagates toward the parabolic mirror 2. The return light $1_{11s}'$ propagates toward the light source 1 arranged at the focal point position of the parabolic mirror 2 via the parabolic mirror 2. In this case, since the principle of disturbing the vibration direction of polarized light upon reflection on the parabolic mirror 2 is the same as that in the first embodiment, a detailed description thereof will be omitted. As described above, since the return light $1_{11s}'$ is not parallel to the parallel light $1_{11}$, it does not accurately propagate toward the light source 1 even after it is reflected by the parabolic mirror 2, and passes by the light source 1 while avoiding the light-emitting portion. The return light $1_{11s}'$, which has passed while avoiding the light-emitting portion, i.e., is not absorbed by the light-emitting portion, is re-incident on the prism 21c' as light $1_{12}$ via the parabolic mirror 2, and is split into light components $1_{12p}$ and $1_{12s}$ by the PBS film 20 again. Since the essence of this embodiment is that at least some of light components returning to the parabolic mirror 2 and the light source 1 via the PBS film 20 do not pass through the light-emitting portion of the light source, the total reflection surface c may form 45° with the parallel light $1_{11}$, and the PBS film 20 may form an angle other than 45° with the parallel light $1_{11}$. One or both of the PBS film 20 and the total reflection film c may have a curvature, so that the optical path of the return light does not pass through the light-emitting portion. In this case, it is to be noted that the incident angle of the light $1_{12}$ which is not parallel light should not considerably exceed an allowable angle of the PBS film 20 having angle dependency.

This embodiment can be considered as an application of FIG. 6B. However, in other embodiments, the same effect as in this embodiment can be provided by changing the inclination of the plane reflection mirror or the total reflection surface for returning light toward the light source or by giving a curvature thereto. When a curvature is given, the reflection mirror or surface is preferably formed as a concave mirror having converging characteristics since light does not diverge and become loss light.

Figure 13:
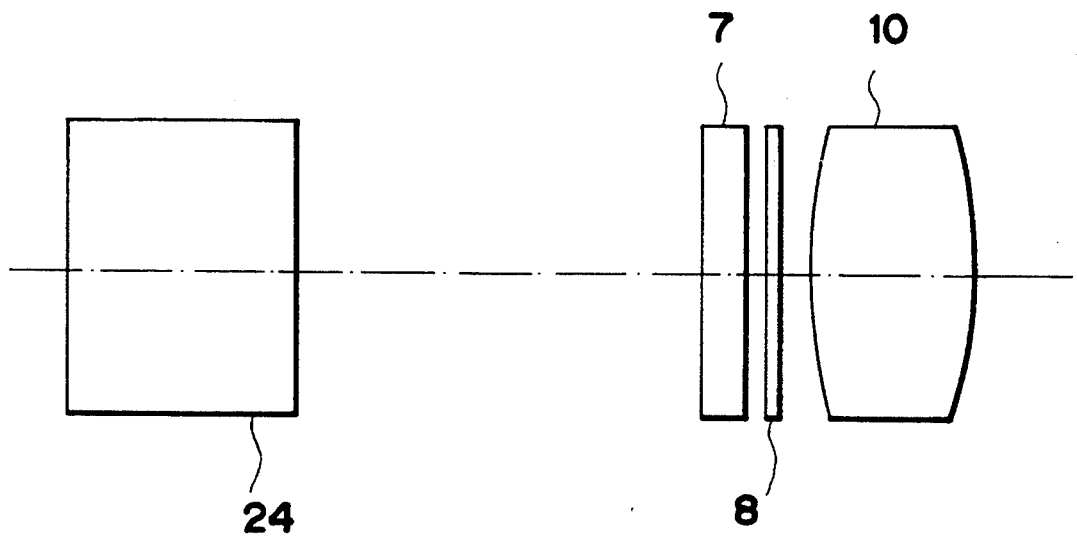
FIG. 13 is a view showing an embodiment of a projector according to the present invention.

FIG. 13 shows an embodiment of a projector according to the present invention. A polarization illumination apparatus 24 adopts one of the embodiments described above.

When polarized light from the polarization illumination apparatus 24 is transmitted through a liquid crystal light valve 7, the light is converted into a beam including image information, and only image light is transmitted through a polarization plate 8. The image light is projected onto a screen (not shown) via a projection lens 10.

Figure 14:
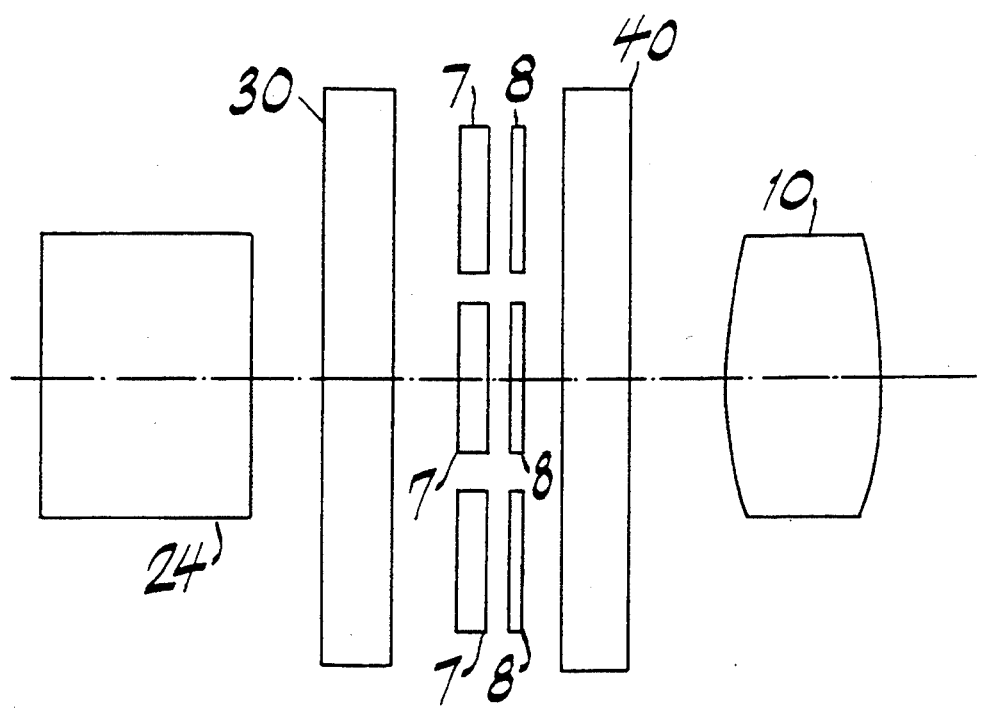
FIG. 14 is a view showing another embodiment of a projector according to the present invention.

As illustrated in FIG. 14, a color separation optical system for separating white light into color light components, i.e., red, blue, and green light components may be arranged between the polarization illumination apparatus 24 and the liquid crystal light valve 7, a color mixing optical system 40 may be arranged between the liquid crystal light valve 7 and the projection light 10, and liquid crystal light valves may be arranged in correspondence with optical paths of respective color components. Some or all components of the color separation optical system may be arranged between the light condensing means and the polarization beam splitting means of the polarization illumination apparatus. In this case, a plurality of polarization beam splitting means are required. In general, since the PBS film has wavelength dependency, a better design which achieves an increase in efficiency and satisfactory color reproduction can be attained if PBS films suitable for color-separated light components are prepared.

A plurality of image light beams may be projected by a plurality of projection lenses without using the color mixing optical system, and may be mixed on the screen. Alternatively, a plurality of polarization illumination apparatuses may be prepared without using the color separation optical system so as to illuminate corresponding liquid crystal light valves.

In the embodiment shown in FIG. 13, when a polarization plate as an analyzer is arranged before the liquid crystal light valve 7, the polarized proportion of polarized light incident on the liquid crystal light valve 7 can be further increased.

The present invention is not limited to the above embodiments, and various changes and modifications may be made without departing from the scope of the invention.

As described above, according to the present invention, a polarization illumination apparatus and a projector with a small light loss can be realized. A quarter-wave optical phase plate normally has wavelength dependency. Since the vibration direction of polarized light can be changed without using the quarter-wave optical phase plate, the present invention is also effective for preventing color nonuniformity.

What is claimed is:

1. An image forming apparatus comprising:
    a light source;
    a first reflecting mirror for reflecting light coming from said light source, wherein the light reflected by said first reflecting mirror comprises first and second polarized components whose polarization planes are different from each other;
    a polarization beam splitter for reflecting said first polarized component and for transmitting said second polarized component;
    a second reflecting mirror for reflecting one component of said first and second polarized components to return said one component to said first reflecting mirror; and
    an image forming means for receiving the other component of said first and second polarized components to form an image by modulating said other component;
    wherein said second reflecting mirror reflects said one component so as to make said one component obliquely incident on said first reflecting mirror, whereby a polarized state of said one component is changed,
    wherein no phase plate for changing the polarization state of said one component is disposed between said first reflecting mirror and said polarization beam splitter, and
    wherein said one component reflected by said first reflecting minor is re-incident on said polarization beam splitter.

2. An image forming apparatus according to claim 1, wherein said light source includes a metal halide lamp or a xenon lamp.

3. An image forming apparatus according to claim 1, wherein said first reflecting mirror has an elliptical or parabolic reflecting surface.

4. An image forming apparatus according to claim 1 further comprising a third reflecting mirror, wherein light outgoing from said light source and not arriving at a light incident surface of said polarization beam splitter is reflected toward said light source by said third reflecting mirror.

5. An image forming apparatus according to claim 1, wherein said second reflecting mirror reflects said one component so that at least one portion of said one component does not pass through a bulb of said light source.

6. An image forming apparatus according to claim 1, wherein said second reflecting mirror is constituted by a polarization beam splitter.

7. An image forming apparatus according to claim 1, wherein said polarization beam splitter includes an optical member wherein a plurality of parallel flat plates are disposed parallel and adjacent to one another.

8. An image forming apparatus according to claim 1, wherein said second reflecting mirror reflects said one component toward said polarization beam splitter.

9. An image forming apparatus according to claim 1 further comprising a projecting optical system for projecting an image formed by said image forming means.

10. An image forming apparatus according to claim 9, wherein said image forming means is provided with a plurality of light valves for forming images having mutually different colors and a color separating means for separating light coming from said first reflecting mirror into a plurality of light beams, each light beam corresponding to one of said plurality of light valves.

11. An image forming apparatus according to claim 10 further comprising color mixing means for mixing light coming from said plurality of light valves.

12. An image forming apparatus according to claim 1, wherein said second reflecting mirror reflects said one component to change the polarized state of said one component to a different polarized state.

13. An image projecting apparatus comprising:
    a light source;
    an optical system for changing light from said light source into a substantially parallel light beam, said optical system having a first reflecting mirror which reflects the light from said light source, wherein the light reflected by said first reflecting minor comprises first and second polarized components whose polarization planes are different from each other;
    a polarization beam splitter for reflecting said first polarized component and for transmitting said second polarized component;
    a second reflecting mirror for reflecting one component of said first and second polarized components to return said one component to said first reflecting mirror;

a light valve for receiving the other light beam of said first and second polarized components to form an image by modulating said other component; and a projecting optical system for projecting said image formed by said light valve;

wherein said second reflecting mirror reflects said one component so as to make said one component obliquely incident on said first reflecting mirror whereby a polarized state of said one component is changed;

wherein no phase plate for changing a polarized state of said one component is disposed between said first reflecting mirror and said polarization beam splitter; and wherein said one component reflected by said first reflecting minor is re-incident on said polarization beam splitter.

14. An image forming apparatus according to claim 13, wherein said second reflecting mirror reflects said one component to change the polarized state of said one component to a different polarized state.

15. An illuminating apparatus comprising:

a light source;

a first reflecting mirror for reflecting light coming from said light source, wherein the light reflected by said first reflecting mirror comprises first and second polarized components whose polarization planes are different from each other;

a polarization beam splitter for reflecting said first polarized component and for transmitting said second polarized component; and a second reflecting mirror for reflecting one component of said first and second polarized components to return said one component to said first reflecting mirror; and wherein said second reflecting mirror reflects said one component so as to make said one component obliquely incident on said first reflecting mirror, whereby a polarized state of said one component is changed, wherein no phase plate for changing the polarization state of said one component is disposed between said first reflecting mirror and said polarization beam splitter, and wherein said one component reflected by said first reflecting mirror is re-incident on said polarization beam splitter.

16. An illuminating apparatus according to claim 15, wherein said second reflecting mirror reflects said one component to change the polarization state of said one component to a different polarized state.

* * * * *

UNITED STATES PATENT AND TRADEMARK OFFICE
CERTIFICATE OF CORRECTION

PATENT NO. : 5,452,128
DATED : September 19, 1995
INVENTOR(S) : Kasumi Kimura

It is certified that error appears in the above-indentified patent and that said Letters Patent is hereby corrected as shown below:

In Column 3, line 52, "parallelray" should read --parallel ray--.
In Column 4, line 20, "indicates-the" should read "indicates the--.
In Column 6, line 58, "(a< <b, c) should read --(a > > b, c)--.
In Column 8, line 17, "pand" should read --p- and--.
In Column 10, line 19, insert a comma after "angle" and before "the".

In Column 12, Claim 13, line 61, "minor" should read --mirror--.

Signed and Sealed this

Second Day of January, 1996

*Attest:*

BRUCE LEHMAN

*Attesting Officer*  *Commissioner of Patents and Trademarks*